US008371922B2

(12) United States Patent
Padgett

(10) Patent No.: US 8,371,922 B2
(45) Date of Patent: *Feb. 12, 2013

(54) GAMING SYSTEM, MACHINE AND METHOD WITH MODIFIED PAYOUT MAPPING

(75) Inventor: John Padgett, Austin, TX (US)

(73) Assignee: Multimedia Games, Inc., Austin, TX (US)

(*) Notice: Subject to any disclaimer, the term of this patent is extended or adjusted under 35 U.S.C. 154(b) by 252 days.

This patent is subject to a terminal disclaimer.

(21) Appl. No.: 12/770,917

(22) Filed: Apr. 30, 2010

(65) Prior Publication Data

US 2010/0222126 A1 Sep. 2, 2010

Related U.S. Application Data

(63) Continuation of application No. 11/084,282, filed on Mar. 18, 2005, now Pat. No. 7,708,634.

(51) Int. Cl.
*A63F 9/24* (2006.01)
*A63F 13/00* (2006.01)

(52) U.S. Cl. ............... 463/19; 463/16; 463/25; 273/269

(58) Field of Classification Search .............. 463/16–20, 463/25, 29–31, 40–42; 273/269
See application file for complete search history.

(56) References Cited

U.S. PATENT DOCUMENTS

| | | | | |
|---|---|---|---|---|
| 4,743,022 | A * | 5/1988 | Wood | 463/13 |
| 5,042,818 | A | 8/1991 | Weingardt | |
| 5,129,652 | A | 7/1992 | Wilkinson | |
| 5,242,163 | A * | 9/1993 | Fulton | 463/13 |
| 5,577,727 | A | 11/1996 | Brame et al. | |
| 5,651,735 | A * | 7/1997 | Baba | 463/18 |
| 5,657,991 | A | 8/1997 | Camarato | |
| 5,679,077 | A | 10/1997 | Pocock et al. | |
| 5,727,786 | A | 3/1998 | Weingardt | |
| 5,935,002 | A | 8/1999 | Falciglia | |
| 6,186,892 | B1 | 2/2001 | Frank et al. | |
| 6,280,325 | B1 | 8/2001 | Fisk | |
| 6,315,290 | B1 * | 11/2001 | Roethel et al. | 273/138.1 |
| 6,315,663 | B1 | 11/2001 | Sakamoto | |
| 6,368,214 | B1 | 4/2002 | Luciano | |
| 6,398,645 | B1 | 6/2002 | Yoseloff | |
| 6,581,935 | B1 | 6/2003 | Odom | |
| 6,702,668 | B2 | 3/2004 | Banyai | |
| 6,722,978 | B2 * | 4/2004 | Valenti | 463/18 |
| 6,832,956 | B1 | 12/2004 | Boyd et al. | |
| 7,056,212 | B2 | 6/2006 | Boyd et al. | |
| 2002/0086725 | A1 * | 7/2002 | Fasbender et al. | 463/11 |
| 2002/0094860 | A1 | 7/2002 | Itkis et al. | |

(Continued)

OTHER PUBLICATIONS

International Search Report dated Sep. 21, 2007 issued in PCT application No. PCT/US06/06268 (2 pages).

(Continued)

*Primary Examiner* — Milap Shah
(74) *Attorney, Agent, or Firm* — Russell D. Culbertson, Esq.; JP Cody

(57) ABSTRACT

A gaming system, apparatus, and method are disclosed which include identifying a set of initial game designations to produce a game ending winner for a game, one or more additional game designations may be considered, that is, compared against a set of elements shown on a card or display in play in the game. Considering these additional game designations in addition to the set of initial game designations may produce additional matched locations on the card or display and may produce a winning pattern that would not have been produced considering only the initial set of game designations. This use of additional game designations provides additional opportunities for players to obtain a winning result.

6 Claims, 4 Drawing Sheets

U.S. PATENT DOCUMENTS

| | | | |
|---|---|---|---|
| 2002/0132661 | A1 | 9/2002 | Lind et al. |
| 2002/0155873 | A1 | 10/2002 | Berman et al. |
| 2002/0177478 | A1 | 11/2002 | Glasson et al. |
| 2003/0104853 | A1 | 6/2003 | Tessmer et al. |
| 2003/0178771 | A1 | 9/2003 | Banyai |
| 2004/0009806 | A1 | 1/2004 | Odom |
| 2004/0152499 | A1 | 8/2004 | Lind et al. |
| 2004/0152508 | A1 | 8/2004 | Lind et al. |
| 2004/0173962 | A1 | 9/2004 | Cheery |
| 2005/0043079 | A1 | 2/2005 | Huang |
| 2005/0059471 | A1 | 3/2005 | Cannon |
| 2005/0096113 | A1 * | 5/2005 | Gabuchian ...................... 463/16 |
| 2005/0233798 | A1 * | 10/2005 | Van Asdale ..................... 463/19 |
| 2005/0266915 | A1 | 12/2005 | Isogai et al. |

OTHER PUBLICATIONS

Written Opinion of the International Search Authority dated Sep. 21, 2007 issued in PCT application No. PCT/US06/06268 (4 pages).

* cited by examiner

GAMING SYSTEM, MACHINE AND METHOD WITH MODIFIED PAYOUT MAPPING

CROSS-REFERENCE TO RELATED APPLICATIONS

This application is a continuation of U.S. patent application Ser. No. 11/084,282, filed Mar. 18, 2005, now U.S. Pat. No. 7,708,634 B2.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights of copyright whatsoever.

BACKGROUND OF THE INVENTION

1. Field of the Invention

This invention relates to gaming systems and to gaming machines used to present gaming results. More particularly, the invention is directed to gaming systems, machines, and methods for modifying payouts in a game.

2. Description of the Related Art

A large number of different gaming machines have been developed to provide various games and game results.

Various games, such as those played with predetermined cards or displays, include a number of designations randomly arranged in a grid, matrix, or other layout of locations. The game board or display may be represented by a data structure which defines a representation having various card or display locations and designations associated with the locations.

For example, in a traditional bingo game sequence, a number of the predetermined bingo cards are first sold for a particular bingo game. After the sale of bingo cards is closed for a given game, designations are randomly selected from a pool of available designations and matched to the designations on each bingo card that is in play in the bingo game. This matching of bingo designations randomly selected for a game and bingo designations associated with a bingo card in play in the game is commonly referred to as daubing the card.

One problem with various games is that the probability of winning or losing with a particular card or display may be determined by a fixed set of constraints. These constraints include the number of designations available in the pool of designations, the predetermined pattern or patterns to be matched, and the number of locations on the card or display. For a given set of constraints, the probabilities of winning and losing are generally fixed.

SUMMARY OF THE INVENTION

The present invention includes gaming systems, machines and methods wherein a first game outcome is randomly or pseudo-randomly generated with a set of indicia, followed by an offer or presentation of one or more randomly or pseudo-randomly generated indicia to enhance the first game outcome and modify or improve the original payout.

According to the invention, after identifying a set of initial game designations to produce a game ending result, one or more additional game designations may be offered or provided in order to achieve a possible winning outcome. For example in a bingo game, considering these additional game designations together with the set of initial game designations may produce additional matched locations on a bingo card and may produce a winning pattern that would not have been produced considering only the set of initial game designations. Thus, the invention provides additional opportunities for players to obtain a winning result.

As used in this disclosure and the accompanying claims, "game designations" refer to the designations or symbols randomly drawn, selected, generated, or identified in a game to present a game outcome. The "set of initial game designations" will refer to those game designations used to identify an initial game outcome, and the "set of additional game designations" will refer to those game designations considered according to the present invention after the set of initial game designations. Finally, unless otherwise specified, a "set" of some element may comprise one or more of those elements.

One method according to principles of the invention includes conducting a community game for a set of players to produce a game ending pattern for a game winning player included in the set of players. The game ending pattern may be a predefined pattern that, when achieved on a card or display, such as by matching the game designations included in the set of initial game designations for the game, signifies an end to that particular game. This method according to the invention also includes identifying a final result for a respective player included in the set of players. For example, this final result may be identified based on a pattern achieved with the respective player's card or display upon matching both the set of initial game designations and a set of additional game designations to that card or display.

A system according to the present invention includes a game result controller and a player station. The game result controller conducts a game to produce the game ending pattern and to identify the final result for a player. The player station includes a display device for displaying the final result to the player at the player station. A supplemental designation controller may be included in the system for determining whether one or more additional game designations will be considered. A prize assignment controller may be included in the system to identify any prize to be awarded to a player after considering the set of initial game designations and the set of additional game designations.

These and other features of the invention will be apparent from the following description of the preferred embodiments, considered along with the accompanying drawings.

DESCRIPTION OF PREFERRED EMBODIMENTS

The following description of the present invention will be made in reference to a particular gaming system disclosed fully in U.S. Patent Publication No. 2004-0152499 entitled "Method, System, and Program Product for Conducting Multiple Concurrent Bingo-Type Games," which is incorporated in this application by this reference. However, it should be noted that this particular gaming system is used only as a convenient example and reference point for disclosing the features of the present invention. The present invention is by no means limited to use in the particular gaming system disclosed in U.S. Patent Publication No. 2004-0152499. Rather, the invention may be used in connection with any gaming system, and particularly those utilizing an electronic player station to present results to a game participant.

Figure 1:
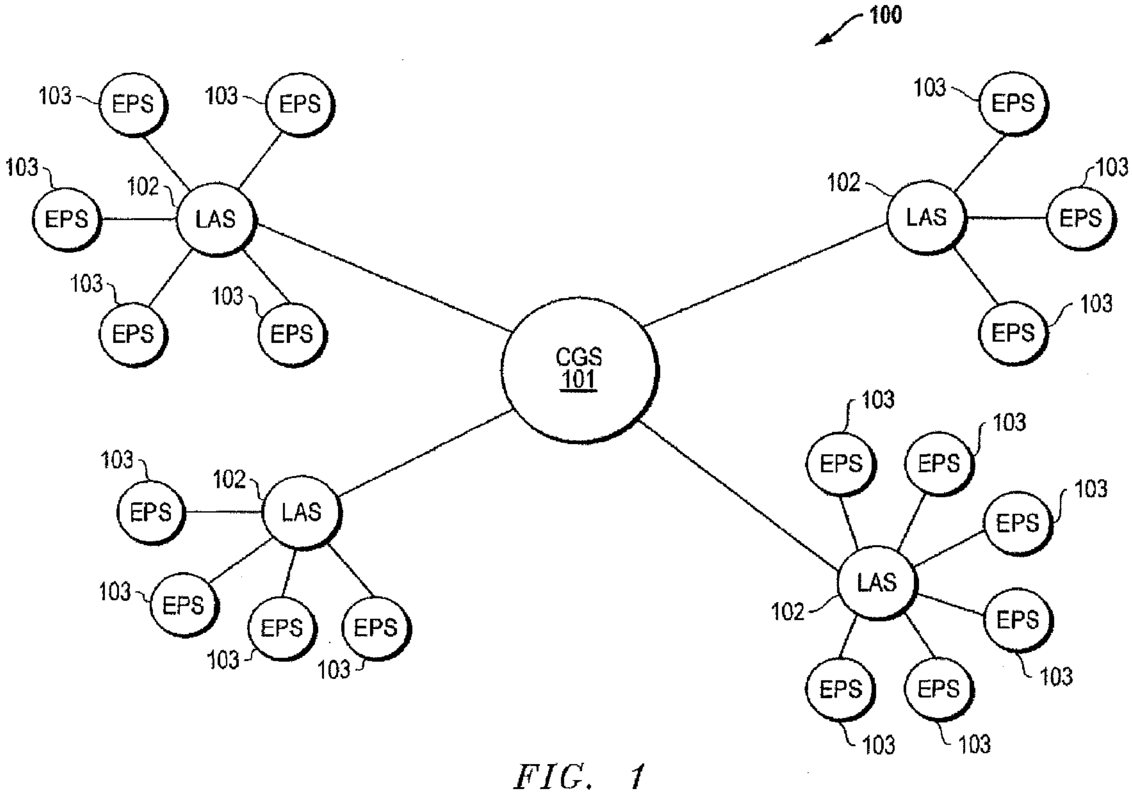
FIG. 1 is a high level diagrammatic representation of a gaming system in which the present invention may be implemented.

Gaming system 100 shown in FIG. 1 includes a central game server (CGS) 101 that cooperates with a number of other components to enable players, preferably at many different remote gaming sites on a network, to participate in bingo games. The example system in FIG. 1 shows four different gaming sites or casinos, each gaming site having a local area server (LAS) 102 and a number of electronic player stations (referred to herein as EPSs or player stations) 103. In the normal operation of gaming system 100, a player at any EPS 103 in the system may participate in a given bingo game with players at any other of the EPSs 103 in the system.

CGS 101 may include one or more computer systems, each including one or more processors, nonvolatile memory, volatile memory, a user interface arrangement (for system operator access), and a network communications interface. Each LAS 102 included in system 100 may also include one or more computer systems each having one or more processors, nonvolatile memory, volatile memory, a user interface arrangement for system operator access, and a network communications interface. Each EPS 103 also preferably includes at least one processing device and a suitable network communication arrangement. Each EPS 103 also includes a player interface arrangement that allows a player to enter bingo games offered through gaming system 100 and display results in an exciting and attractive format. This player interface may include one or more player input devices, one or more displays or touch screen displays, a sound system, a convenient arrangement for dispensing winnings and allowing the player to make wagers, and perhaps other features such as alarms or special displays or alerting devices.

The details of CGS 101, LASs 102, and EPSs 103 in FIG. 1 are not shown in that figure so as not to obscure the invention in unnecessary detail. Structural details relevant to the present invention will be discussed with reference to FIG. 2 below. However, it will be appreciated that each of the processing devices included in system 100 preferably operates under the control of operational program code to perform or direct the various functions provided by the respective system component. Alternatively, the various functions performed by CGS 101, each LAS 102, and each EPS 103 may be performed through special purpose processing devices or circuits.

In operation, a player in system 100 shown in FIG. 1 will enter a game play request through an EPS 103. This game play request represents a request to participate in a bingo game conducted through system 100. Variations in how a game play request may be entered/submitted according to the present invention will be described below with reference to FIG. 3. Regardless of how a given game play request for a player is produced and submitted, the game play request will, at some point in system 100, be associated with a particular bingo card in the form of data that represents/defines the bingo card. This data representing/defining a bingo card may be referred to as a bingo card representation. The bingo card associated with a game play request is eventually matched with a set of initial game designations for a bingo game, and perhaps a set of additional game designations, to identify a final result for the game play request. This final bingo game result is commonly correlated to a prize value. As will be discussed in detail below, the present invention produces a final prize value that does not necessarily correspond to the prize value indicated by the result in the bingo game that would be obtained considering only the set of initial game designations. Rather, the final prize value may be varied by considering the set of additional game designations.

The particular configuration of devices shown in FIG. 1 is shown only for purposes of example. A gaming system according to the present invention may omit some or all of the separate LASs 102 at the various gaming facilities so that the EPSs 103 communicate directly with CGS 101. Also, various regions or different gaming facilities may be divided up into separate systems each having a respective CGS such as CGS 101. In these situations, the system could be configured such that a single EPS 103 may be serviced by any of the CGSs. Furthermore, a gaming system embodying the principles of the invention may include multiple CGSs rather than a single CGS 101 as shown in FIG. 1. Finally, it will be noted again that the gaming system shown in FIG. 1 is shown only for purposes of example in order to provide a convenient context to describe the present invention below. The present invention is by no means limited to use in bingo gaming system 100 shown in FIG. 1. Rather, the present invention may be applied to any bingo game, whether manual or electronic, and whether games are conducted in a traditional bingo sequence or conducted in some other sequence, such as where bingo cards are compared to a set of game designations to identify results prior to assignment of the bingo cards to players.

Figure 2:
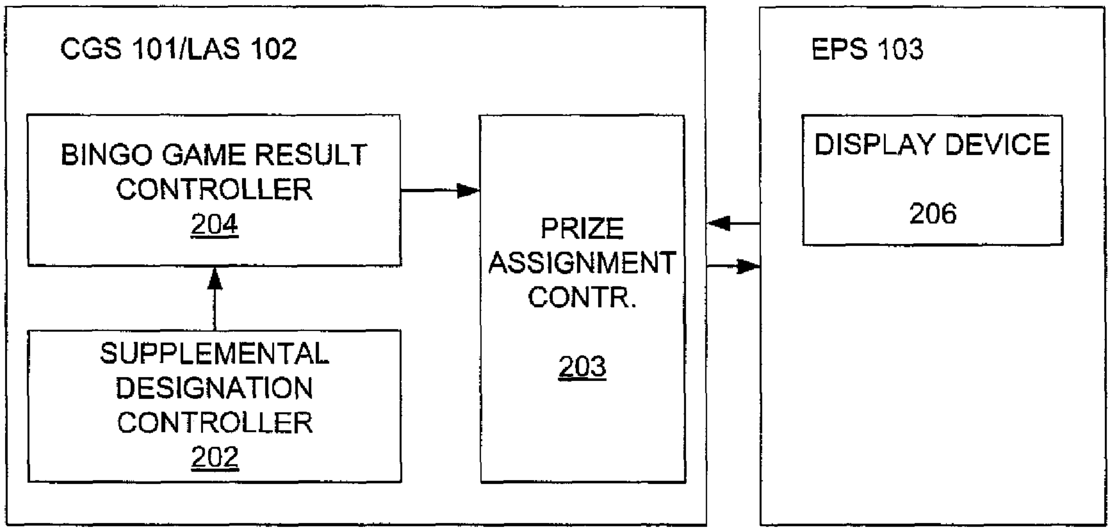
FIG. 2 is a diagrammatic representation of a system embodying principles of the present invention.

FIG. 2 shows various components of the present invention as implemented in the gaming system 100 shown in FIG. 1. The present invention includes a supplemental designation controller 202 and a prize assignment controller 203. Supplemental designation controller 202 determines whether one or more additional game designations will be considered for one or more players in a bingo game. Prize assignment controller 203 identifies a prize value for the game play request and assigns that prize value based on the pattern produced for the associated bingo card considering only the set of initial game designations or, if supplemental designation controller so indicates, based on the pattern produced for the associated bingo card considering both the set of initial game designations and one or more additional game designations.

The preferred form of the invention shown in FIG. 2 also includes a bingo game result controller 204. This bingo game result controller 204 comprises the component of system 100 (FIG. 1) that receives a game play request for a player, and compares the bingo card associated with the game play request with the set of initial game designations to identify any winning patterns that may be produced by matches between the game designations and the card designations. In particular, bingo game result controller 204 identifies any game ending pattern produced on the bingo card. The game designations required to first produce this game ending pattern for a given bingo game may be taken as the set of initial game designations in some forms of the invention. Bingo game result controller 204 may also produce a random sequence of designations to be used as the set of initial game designations and/or the set of additional game designations according to the present invention. Alternatively, a separate component may be included in the system to provide random sequences of game designations to bingo game result controller 204.

As indicated in FIG. 2, an EPS 103 is in communication with the system component or components that implement controllers 202, 203, and 204. The EPS 103 shown in FIG. 2 includes a display device 206 that is used to display results for a given bingo game play request to a player at the EPS. These results may be displayed in any number of different fashions within the scope of the present invention. In addition to displaying the prize value, display device 206 preferably displays the bingo game result in the form of some entertaining graphic representation that indicates the awarded prize. This entertaining graphic representation may be associated with bingo, or may be associated with an entirely different type of game, such as a reel-type (slot machine) game, a card game, or any other type of game.

It will be appreciated that the arrangement of controllers shown in FIG. 2 is shown only for purposes of example. Although FIG. 2 shows controllers 202, 203, and 204 all implemented at a common processing device or system (the CGS 101 or a LAS 102 as described in connection with FIG. 1), preferred forms of the invention may implement these controllers at separate processing devices. For example, bingo game result controller 204 may be implemented at a centralized device such as the CGS 101 in FIG. 1, while supplemental designation controller 202 and prize assignment controller 203 may be implemented at a different component in system 100. In one preferred form of the invention, each LAS 102 implements a prize assignment controller 203 for the EPSs 103 serviced by the respective LAS. In yet another preferred form of the invention, each EPS 103 may implement its own supplemental designation controller 202 and prize assignment controller 203. Yet other preferred forms of the invention may implement supplemental designation controller 202 and prize assignment controller 203 at different components in system 100. For example, each EPS 103 may implement its own respective prize assignment controller 203 and each LAS 102 may implement a supplemental designation controller for each EPS 103 serviced by the respective LAS.

Figure 3:
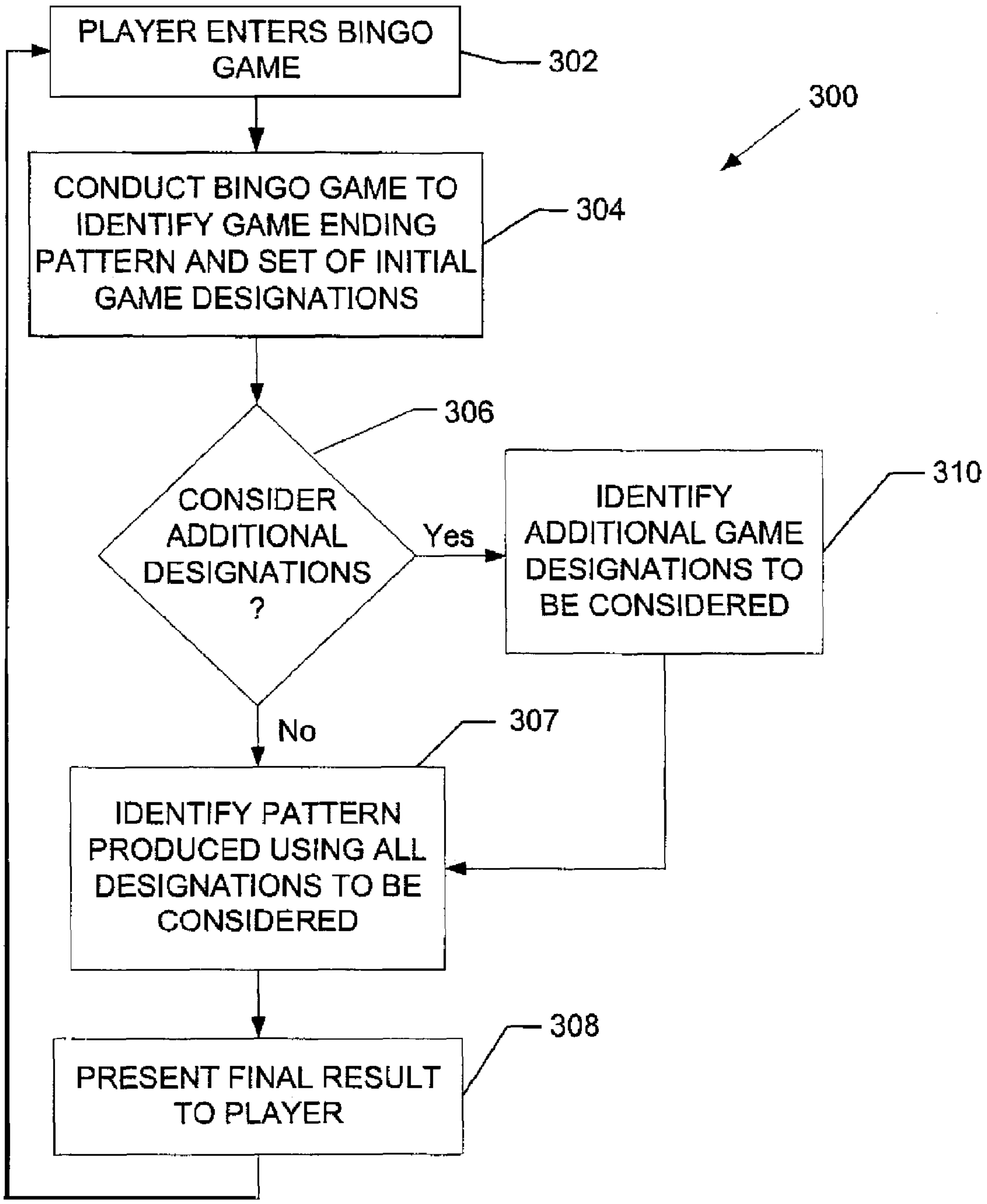
FIG. 3 is a flow diagram illustrating a gaming method embodying principles according to the present invention.

The flow diagram shown in FIG. 3 illustrates a gaming method 300 embodying principles according to the present invention. A player first enters a bingo game as indicated at process block 302. The player's entry in the game will be associated with a particular bingo card for the player. At process block 304, the bingo game is conducted to identify a game ending pattern and a set of initial game designations. At decision block 306, a decision is made as to whether to consider additional game designations in addition to the initial game designations. If no additional game designations are to be considered, the pattern produced on the player's bingo card considering only the initial game designations is identified as indicated at block 307. A final result presented for the player is then presented to the player as shown at process block 308. This final presented result will include any prize/award associated with the pattern produced on the player's bingo card considering only the initial game designations. On the other hand, if additional game designations are to be considered as indicated by the decision at block 306, one or more additional game designations are identified as shown at process block 310. The process then proceeds to block 307 at which the pattern of matched locations on the player's bingo card is identified considering the initial game designations and the additional designations. A final result for the player is then presented to the player as shown at process block 308, however, the final result in this scenario includes any prize/award associated with the pattern identified on the player's bingo card considering both the initial game designations and the additional game designations.

It will be appreciated that the process shown in FIG. 3 is the process followed for a single player in the gaming system. Depending upon the nature of the gaming system, there are commonly two or more different players competing in a given bingo game. The same process shown in FIG. 3 is preferably conducted for each different player in a particular bingo game.

In the example gaming system 100 shown in FIGS. 1 and 2, a player enters a bingo game by submitting a game play request through one of the EPSs 103 using the player interface provided at the EPS. As discussed in the incorporated U.S. Patent Publication No. 2004-0152499, numerous different interface procedures may be employed at an EPS 103 to cause a game play request to be submitted. On one end of the spectrum, the player may be required to choose a bingo card, choose a wager, and make other choices prior to making an input that submits the game play request. On the other end of the spectrum, a player may need only activate a "play" control at the EPS 103 to cause a game play request to be submitted. It will be noted again, however, that the present invention is by no means limited to use in the example gaming system shown in FIG. 1. Rather, the invention may be used in connection with any bingo gaming system utilizing an electronic player station to present results to a bingo game participant. The invention may also be applied in bingo gaming systems in which players participate by purchasing paper bingo cards and use no player station to provide a player interface. In these paper bingo card gaming systems, a player enters the bingo game by purchasing a bingo card rather than submitting a game play request through a player station.

Identifying the set of initial game designations as indicated at process block 304 preferably includes matching one game designation after another to each bingo card in play in the respective bingo game, and noting card designation matches until one of the bingo cards in play in the bingo game produces a game ending pattern. In this form of the invention, the number of game designations required to first produce this game ending pattern is considered the set of initial game designations. A player who owns a bingo card that produces the game ending pattern considering the designations included in the set of initial game designations is considered a game ending winner. Although using the number of game designations required to produce a game ending pattern is a preferred form of the invention, other preferred embodiments may use a predetermined number of game designations as the set of initial game designations. Regardless of specifically how the set of initial game designations is determined, in the example system 100 of FIGS. 1 and 2, the comparison of game designations to the bingo cards in play in a game is preferably performed with the bingo game result controller 204 implemented at either the LAS 102 or CGS 101.

The decision as to whether additional game designations are to be considered as indicated at decision block 306, may be made in any suitable fashion within the scope of the present invention. In one preferred embodiment, the decision is based on a random number generated by a random number generator associated with supplemental designation controller 202 shown in FIG. 2. In this random number-based decision form of the invention, supplemental designation controller 202 causes a random number to be generated within a certain range of numbers. This range of numbers is itself divided into different ranges, each range being associated with a number of additional game designations to be considered from none to some predetermined number. Once the random number is generated, supplemental designation controller 202 identifies the number of additional game designations to be considered from the range in which the random number is included. If the number is zero, then the decision indicated at decision block 306 is that no additional game designations are to be considered. However, if the number associated with the given range of random numbers is not equal to zero, the indicated number of additional game designations are to be considered according to the invention. An example of this preferred embodiment will be described further below with regard to Table I and FIG. 4.

The decision indicated at decision block 306 in FIG. 3 as to whether additional game designations will be considered may be based at least partially on a player's choice. For example, some forms of the invention will consider additional game designations only when a player makes an additional wager, that is, a wager in addition to any wager made to enter the game at block 302. In these forms of the invention, the player is offered a choice to proceed to potentially consider additional game designations at the cost of an additional wager, or to forego the additional wager and the potential to consider additional game designations.

In some forms of the invention, the value of a bingo pattern produced with a player's bingo card may be influenced by the number of game designations that are considered to produce the bingo pattern. For example, in one embodiment, a straight line bingo pattern produced by considering five game designations is associated with a higher prize/value than the same straight line pattern that is produced by considering twenty-five game designations. Thus, in one embodiment of the present invention, a player may be given the opportunity to forego any potential for considering additional game designations because of the potential detrimental effect additional game designations may have on the value of a given pattern. The player may be given this choice either after it is determined whether additional game designations may be considered or before this determination is made. That is, the number of additional game designations that may be considered may be determined and presented to the player in some fashion prior to the time that the player is required to choose whether to accept the additional game designations or stick with the result produced considering only the initial game designations. In any of the embodiments in which a player is given a choice as to whether additional game designations will be considered, at the point in play at which the player must make their choice, the player may or may not be shown the result that would be produced considering only the initial game designations.

FIG. 3 shows only a single decision block 306 indicating a decision as to whether additional game designations will be considered. The present invention is, however, not limited to a single decision. Some forms of the present invention may include multiple points at which a decision is made as to whether to consider additional game designations. For example, a player may accept a first set of additional game designations and be shown the results that would be obtained considering that first set of additional game designations. The player may then be given another choice of whether to accept a second set of additional game designations, either with or without some additional wager.

The invention encompasses any way to identify additional game designations to be considered in a bingo game as shown at process block 310. In some forms of the invention, an initial ball draw/random designation generator sets a sequence for the entire universe of designations that may be drawn in a bingo game. In these forms of the invention, the set of initial game designations may comprise the initial part of the sequence required to produce the game ending pattern and any additional game designation comprises simply the next designation in that sequence. Other forms of the invention may remove the set of initial game designations and then select any additional game designations at random from that limited set of designations. Furthermore, the number of additional game designations that may be considered may be determined in any suitable fashion. Some forms of the invention may consider some fixed number of additional game designations in response to an affirmative result at decision block 306 in FIG. 3. Other forms of the invention may determine not only whether additional game designations will be considered but also the number of additional game designations that will be considered.

The process of identifying the pattern of matched card locations shown at process block 307 in FIG. 3 may be performed in any suitable fashion. In some preferred forms of the invention, bingo game result controller 204 shown in FIG. 2 is responsible for identifying any patterns produced on a given player's bingo card by matching the game designations to be considered against the card designations included on the player's bingo card. Regardless of the system component that identifies any patterns as indicated at process block 307 in FIG. 3, any suitable method may be employed to identify patterns.

Results in the game for a given player are identified at process block 307 in FIG. 3 at least partially based on any predetermined patterns of any matched bingo card locations that have been identified on the bingo card. Certain patterns map to certain prizes such that the pattern of a player's bingo card maps to a prize to be awarded to the player. For example, a prize of ten credits may be correlated with an 'X' pattern achieved on a player's bingo card, while a prize of five credits may be correlated to a straight line pattern. Any credit value for a given pattern may be reduced by some amount based on the number of game designations considered to produce the pattern. Some forms of the invention may employ a table that correlates a pattern, that is, a pattern identifier, and any other considerations such as the number of game designations considered to produce the pattern with a given credit value. This table may be queried with the pattern identifier and a value representing the number of game designations considered, where such a value is employed, to identify the prize for a given game play. The pattern identifier and any other value having a bearing on the prize to be awarded is also preferably correlated to a graphic representation for the prize. This step of identifying the prize as indicated at process block 307 in FIG. 3 and identifying any graphic to be used to show the result to the player is preferably performed by the prize assignment controller 203 shown in FIG. 2. However, it will be appreciated that the function of identifying the prize and any graphic that may be used to represent the prize may be performed by some other component of the gaming system according to the present invention.

The step of presenting the results to the player as indicated at process block 308 in FIG. 3 is performed through the EPS 103 in the form of the invention shown in FIG. 2. More specifically, the results are preferably presented by graphical representations produced on the display device 206 associated with EPS 103. For example, the results may be shown by displaying the game designations considered in the game and a graphical representation of the player's bingo card together with each daubed card location and with any winning pattern highlighted. Alternatively, or in addition to this bingo card presentation, some other graphical presentation such as a slot-machine type presentation, card game presentation, or some other type of presentation unrelated to bingo as described in U.S. Patent Publication No. 2002-0132661 entitled "Method, Apparatus, and Program Product for Presenting Results in a Bingo-Type Game." The number of credits or currency won on the particular play would preferably be included in any graphical presentation used to present the result to the player.

Especially in the embodiments of the invention in which the decision on whether to consider additional game designations is at least partially based on a player's choice input, an initial graphic presentation may be used to present the result to the player, whether a winning result or a losing result, that is achieved in the bingo game considering only the set of initial game designations. This initial graphic presentation may also comprise a bingo-related or a non-bingo graphical presentation, and preferably includes a graphic indicating that the player has a choice of standing on the initial results or continuing with a chance for one or more additional game designations to be considered. Following the presentation of the result considering only the set of initial game designations, the player's display device 206 may produce special graphics to announce that additional game designations are being considered. The graphics associated with the presentation indicated at block 308 in FIG. 3 may then be portrayed as simply another part of the game or as a "bonus" result.

The process shown in FIG. 3 may be performed entirely separately for each different player participating in a multiple player bingo game. However, some of the process steps may apply equally for each different player playing in a multiple-player bingo game in some implementations of the invention. In particular, the decision whether to consider additional game designations may be made for each player in a given bingo game or for each player participating in a respective bingo game at a given time.

Figure 4:
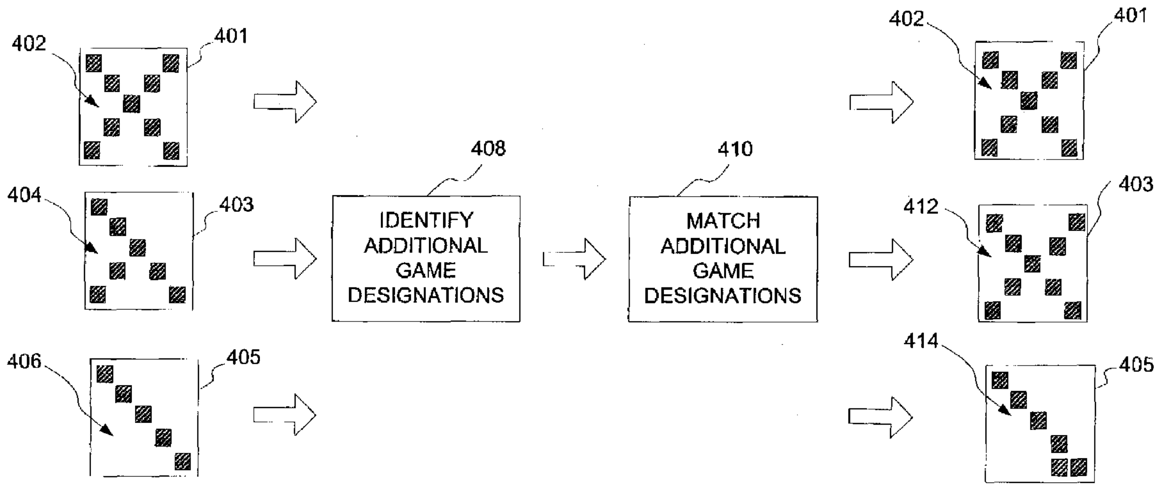
FIG. 4 is a diagram illustrating three examples of bingo pattern progression during a bingo game conducted according to the method illustrated in FIG. 3.

FIG. 4 shows examples of the process shown in FIG. 3 for three different bingo cards 401, 403, and 405. On the far left hand side of the FIG. 4, bingo cards 401, 403, and 405 are shown with the patterns resulting after matching only the set of initial game designations in a respective bingo game. The same bingo cards 401, 403, and 405 are shown on the far right hand side of FIG. 4 after considering one or more additional game designations according to the present invention.

In the example of FIG. 4, after the set of initial game designations are considered, bingo card 401 is identified as having been daubed with an 'X' pattern 402. Bingo card 403 is daubed with bingo pattern 404 which is a diagonal straight line pattern with two extra spots being daubed, and bingo card 405 is daubed with a straight line bingo pattern 406. Process block 408 represents the step of identifying one or more additional game designations. This step corresponds to the step shown at process block 310 in FIG. 3. Process block 410 represents the matching of any additional game designations to the various bingo cards. This step corresponds to the portion of the process shown at block 307 in FIG. 3 in which the additional game designations are matched to the bingo card.

The example modifications of bingo patterns 402, 404, and 406 demonstrate three general modification possibilities that exist in the present invention. First, as illustrated by bingo card 401, a bingo pattern could remain the same after an additional ball draw and no modification of the matched pattern would occur in the bingo game. Thus, for example, bingo card 401 remains valued at 10 credits for the 'X' bingo pattern 402. Second, as illustrated by bingo card representation 403, a bingo pattern could be modified after the additional game designations and a new prize could be associated with the modified pattern. In this example, two additional card locations are matched to produce bingo pattern 412. The prize associated with bingo card 403 is also modified from the prize correlated to pattern 404, for example five credits, to an 'X' pattern, which may be worth ten credits for example. Third, as illustrated by bingo card 405, a bingo pattern could be modified but with no prize modification. In this example, the straight line pattern 406 is modified to pattern 414 with one additional location matched. However, because the only paying pattern contained in modified bingo pattern 414 is still only a straight line pattern, the prize is not modified.

In other embodiments, for example, where the number of additional designations that are drawn in a bingo game affect the prize that is awarded to a player, the prize associated with bingo pattern 406 could be reduced from five credits to four credits for bingo pattern 414 because additional game designations were considered but still only produced a straight line bingo pattern. Likewise, the ten credit prize associated with the 'X' bingo pattern could be reduced to nine credits, for example, when additional game designations fail to change the 'X' pattern of bingo card 401 or when the 'X' bingo pattern 412 is produced only after considering additional game designations after the initial game designations. In some forms of the invention, a player may or may not improve their overall prize by the additional ball draw even if another winning pattern is produced considering the additional game designation.

As discussed above with reference to FIGS. 2 and 3, the decision as to whether to consider additional game designations may be made with the use of a random number generator. Different ranges of the random numbers may be associated with whether additional game designations will be considered and/or the number of additional game designations to consider. A specific example may be described with reference to Table I below:

TABLE I

| Random Number Range | No. of Additional Game Designations |
|---|---|
| 98-100 | +4 |
| 95-97 | +2 |
| 0-94 | 0 |

In Table I, three different number ranges are illustrated for numbers between 0-100. The different number ranges each correspond to a different number of additional game designations to consider. In operation, a random number between 0 and 100 is generated and then used to identify the number of additional game designations to be considered. In this particular example, if the randomly generated number falls in the range from 98-100, four additional game designations will be considered, and if the randomly generated number falls in the range from 95-97, two additional game designations will be considered. Finally, if the randomly generated number falls in the remaining range, that is, the range from 0-94, no additional game designations will be considered.

It should be appreciated that the additional game designations considered according to the present invention may not match any of the designations on a given bingo card. In the example of bingo card 401 in FIG. 4, assume that four additional game designations are to be considered. These additional game designations that are identified and then compared to the bingo card do not result in additional card location matches. Alternatively, some or all of the additional game designations may match designations of a bingo card. In the example of bingo card 405 in FIG. 4, assume that four additional game designations are to be considered. As shown at the far right of FIG. 4, consider the four additional game designations results in one additional card location being matched.

As will become apparent to one of ordinary skill in the art, further variations for considering additional game designations in a bingo game are possible and are within the scope of the following claims. The above described preferred embodiments are intended to illustrate the principles of the invention, but not to limit the scope of the invention. Various other embodiments and modifications to these preferred embodiments may be made by those skilled in the art without departing from the scope of the invention. For example, although traditional five-by-five bingo cards are shown for purposes of example in FIG. 4, the invention may be used with any bingo card size or configuration.

The invention claimed is:

1. A method for operating a wager game, including the steps of:

accepting a first wager from a player to initiate the wagering game at a gaming device;

providing the player with a set of game symbols for play of the wagering game;

randomly or pseudo-randomly generating an initial outcome of the game including a set of initial outcome symbols with a processor;

in accordance with the initial outcome displaying an initial game presentation including the set of initial outcome symbols matched with the set of game symbols to present one or more patterns, the one or more patterns being associated with one or more award values;

randomly or pseudo-randomly generating a value and a set of additional outcome symbols, the number of additional outcome symbols being determined by the value;

providing the player the opportunity to forego any potential winnings for employing the set of additional outcome symbols based on a potential detrimental effect that the set of additional outcome symbols may have on an award of a given pattern of the one or more patterns already achieved by the player;

in response to providing the opportunity, receiving player input from an input device of the gaming device opting to employ the set of additional outcome symbols;

in response to receiving the player input indicating the player has chosen to employ additional symbols, displaying a second game presentation including the set of additional outcome symbols, the set of initial outcome symbols, and the set of game symbols corresponding to a second outcome of the game; and providing an award corresponding to the second outcome.

2. The method of claim 1 wherein the second outcome corresponds to an improvement over the initial outcome.

3. The method of claim 1 including the step of:

accepting a second wager from the player prior to determining the second outcome.

4. The method of claim 1, further comprising, when providing the player the opportunity to forego any potential winnings for employing the set of additional outcome symbols, also providing an indication of the number of additional symbols randomly or pseudo-randomly determined to be employed prior to a time that the player is required to choose whether to accept the number of additional symbols or maintain the initial outcome produced considering only the set of initial outcome symbols.

5. A method for operating a community wagering game, including the steps of:

accepting a first wager from two or more players to initiate the wagering game at respective gaming devices;

at each gaming device:

a) providing a set of game symbols for play of the wagering game b) randomly or pseudo-randomly generating an initial outcome of the game including a set of initial outcome symbols with a processor;

c) in accordance with the initial outcome displaying an initial game presentation including the set of initial outcome symbols matched with the set of game symbols to present one or more patterns, the one or more patterns being associated with one or more award values;

d) randomly or pseudo-randomly generating a value and a set of additional outcome symbols, the number of additional outcome symbols being determined by the value;

e) providing the player the opportunity to forego any potential winnings for employing the set of additional outcome symbols based on a potential detrimental effect that the set of additional outcome symbols may have on an award value of a given pattern of the one or more patterns already achieved by the player;

f) in response to providing the opportunity, receiving player input from an input device of the gaming device opting to employ the set of additional outcome symbols;

g) in response to receiving the player input indicating the player has chosen to employ the additional symbols, displaying a second game presentation including the set of additional outcome symbols, the set of initial outcome symbols, and the set of game symbols corresponding to a second outcome of the game;

determining a winner of the two or more players based on the second outcomes of the respective gaming devices; and providing an award to the winner.

6. The method of claim 5, further comprising, when providing the player the opportunity to forego any potential winnings for employing the set of additional outcome symbols, also providing an indication of the number of additional symbols randomly or pseudo-randomly determined to be employed prior to a time that the player is required to choose whether to accept the number of additional symbols or maintain the initial outcome produced considering only the set of initial outcome symbols.

* * * * *